United States Patent
Wehinger

(10) Patent No.: US 8,873,678 B2
(45) Date of Patent: Oct. 28, 2014

(54) METHOD FOR PROCESSING DATA

(75) Inventor: Joachim Wehinger, Taufkirchen (DE)

(73) Assignee: Intel Mobile Communications GmbH, Neubiberg (DE)

(*) Notice: Subject to any disclaimer, the term of this patent is extended or adjusted under 35 U.S.C. 154(b) by 689 days.

(21) Appl. No.: 12/939,327

(22) Filed: Nov. 4, 2010

(65) Prior Publication Data

US 2012/0114016 A1  May 10, 2012

(51) Int. Cl.
H04L 27/00 (2006.01)
H04B 7/08 (2006.01)
H04B 7/06 (2006.01)

(52) U.S. Cl.
CPC ............ *H04B 7/0671* (2013.01); *H04B 7/0854* (2013.01); *H04B 7/0689* (2013.01); *H04B 7/0669* (2013.01); *H04B 7/0697* (2013.01)
USPC ........... 375/299; 375/260; 375/267; 370/203; 370/208

(58) Field of Classification Search
USPC ........... 375/260, 267, 299, 347; 370/203–211
See application file for complete search history.

(56) References Cited

U.S. PATENT DOCUMENTS

| | | | |
|---|---|---|---|
| 2006/0146759 A1* | 7/2006 | Guo et al. | 370/335 |
| 2008/0144733 A1* | 6/2008 | ElGamal et al. | 375/267 |
| 2009/0316807 A1* | 12/2009 | Kim et al. | 375/260 |
| 2011/0075752 A1* | 3/2011 | Zheng et al. | 375/267 |
| 2011/0080972 A1* | 4/2011 | Xi et al. | 375/267 |
| 2011/0149914 A1* | 6/2011 | Tidestav | 370/335 |
| 2012/0140801 A1* | 6/2012 | Asplund et al. | 375/219 |

OTHER PUBLICATIONS

S.M. Alamouti, "A Simple Transmit Diversity Technique for Wireless Communications", IEEE Journal on Selected Areas in Communications, vol. 16, No. 8, Oct. 1998, p. 1451-1458.
A. Paulraj, et al., "Introduction to Space-Time Wireless Communications" Cambridge University Press, 2003, p. 92-93, 96-97.
3GPP, Technical Specification Group Radio Access Network, Physical Layer Procedure (FDD), 3GTS 25.214, Version v8.9.0, Mar. 2010, p. 1-94.

* cited by examiner

*Primary Examiner* — Curtis Odom
(74) *Attorney, Agent, or Firm* — Eschweiler & Associates, LLC

(57) ABSTRACT

A method and transmitter are disclosed. The method includes encoding data according to a space time transmit diversity scheme and spatial-multiplexing the encoded data. The transmitter includes first and second units. The first unit is configured to encode data according to a space time transmit diversity scheme and the second unit is configured to spatial-multiplex encoded data. The transmitter is configured to operate in an operating mode in which data is processed by the first unit and the second unit.

16 Claims, 4 Drawing Sheets

METHOD FOR PROCESSING DATA

BACKGROUND

The invention relates to a transmitter, a receiver and a method for processing data in a transmitter and a receiver. In particular, the invention relates to improving the quality of a data transmission between a transmitter and a receiver.

In radio frequency communications systems, transmitted signals may propagate from a transmitter to a receiver via different transmission channels. During an equalization of the received data streams in the receiver, the data streams may consider each other as an interference source which may result in a degradation of the receiver's performance.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
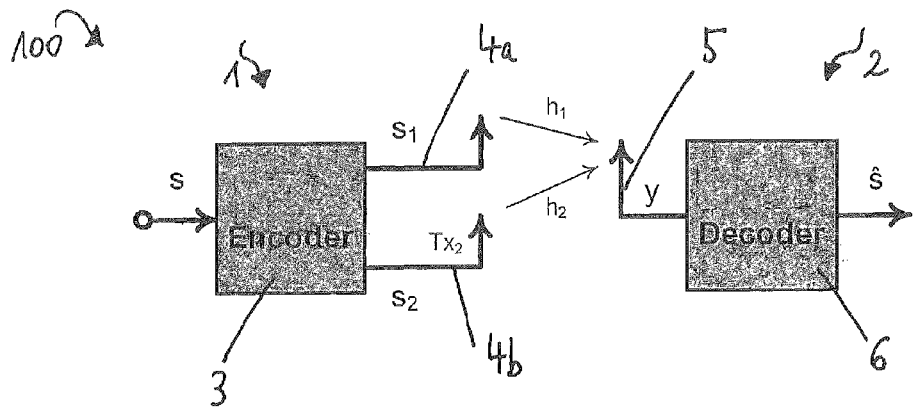
FIG. 1 schematically illustrates a radio frequency communications system 100.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense, and the scope of protection is defined by the appended claims.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made, without departing from the scope of the present disclosure.

In addition, while a particular feature or aspect of an embodiment may be disclosed with respect to only one of several implementations, such feature or aspect may be combined with one or more other features or aspects of the other implementations as may be desired and advantageous for any given or particular application. Further, to the extent that the terms "include", "have", "with" or other variants thereof are used in either the detailed description or the claims, such terms are intended to be inclusive in a manner similar to the term "comprise". Also, the term "exemplary" is merely meant as an example, rather than the best or optimal.

The methods and devices described herein may be used for various wireless communication networks such as Code Division Multiple Access (CDMA), Time Division Multiple Access (TDMA), Frequency Division Multiple Access (FDMA), Orthogonal FDMA (OFDMA) and Single Carrier FDMA (SC-FDMA) networks. The terms "network" and "system" are often used interchangeably. A CDMA network may implement a radio technology such as Universal Terrestrial Radio Access (UTRA), cdma2000, etc. UTRA includes Wideband-CDMA (W-CDMA) and other CDMA variants. cdma2000 covers IS-2000, IS-95 and IS-856 standards. A TDMA network may implement a radio technology such as Global System for Mobile Communications (GSM) and derivatives thereof such as e.g. Enhanced Data Rate for GSM Evolution (EDGE), Enhanced General Packet Radio Service (EGPRS), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). The above mentioned standards are, inter alia, described in documents provided by the "3rd Generation Partnership Project" (3GPP) organization. In particular, the contents of the document 3GPP TS 25.214 V8.9.0 (2010-03), 3rd Generation Partnership Project; Technical Specification Group Radio Access Network; Physical layer procedures (FDD) (Release 8) are included herein by reference.

The methods and devices described herein may further be operated according to a Multiple Input Multiple Output (MIMO) technique providing the use of multiple antennas at both the transmitter and receiver. MIMO is a part of wireless communications standards such as IEEE 802.11n (Wi-Fi), 4G, 3GPP Long Term Evolution, WiMAX and HSPA+. In particular, the presented methods and devices may be read in connection with MIMO techniques applied to High Speed Downlink Packet Access (HSDPA) systems, i.e. MIMO-HSDPA. In this context, the term "spatial-multiplexing" may be used which corresponds to a transmission technique in MIMO wireless communication and which may be used to transmit independent and separately encoded data signals, so-called streams, from each of the multiple transmit antennas. The encoding of data in spatial-multiplexing may be based on an open-loop approach or a closed-loop approach.

In addition, the described methods and devices may refer to a Space Time Transmit Diversity (STTD) scheme which may also be referred to as Space Time Block Coding Based Transmit Diversity. STTD is a method of transmit diversity, for example used in UMTS third generation cellular systems. STTD utilizes STBC (Space Time Block Codes) in order to transmit multiple copies of a data stream over a number of antennas to exploit the various received versions of the data such that the reliability of the data transfer may be improved.

In radio communications systems a transmitter transmitting one or more radio communications signals on one or more radio communications channels may be present. In particular, the transmitter may be a base station or a transmitting device included in a user's device, such as a mobile radio transceiver, a handheld radio device or any similar device. According to the UMTS standard, a transmitter or base station may also be referred to as Node B. Radio communications signals transmitted by transmitters may be received by receivers such as a receiving device in a mobile radio transceiver, a handheld radio device or any similar device. In particular, radio communications systems as disclosed herein may include UMTS systems, which may conform to the 3G PP standard for UMTS systems. According to the UMTS standard, a receiver or mobile station may also be referred to as User Equipment (UE). Radio communications signals as disclosed herein may be provided in UMTS systems, in particular over radio communications physical channels, such as primary common pilot channels, secondary common pilot channels, dedicated physical channels, dedicated physical control channels or similar channels according to the UMTS standard.

FIG. 1 schematically illustrates a radio frequency communications system 100 including a transmitter 1 and a receiver 2. The transmitter 1 includes an encoder 3 configured to encode data according to an STTD scheme and two transmit antennas 4a, 4b. The transmit antennas 4a, 4b are configured to broadcast data signals via transmission channels indicated by arrows and the corresponding channel coefficients $h_1$ and $h_2$. It is understood that the transmitter 1 may include further components which are not explicitly illustrated in FIG. 1 for the sake of simplicity. For example, the transmitter 1 may include a digital signal processor for processing signals in the digital domain, digital filters for filtering the transmitted signals, a digital/analogue converter for converting digital signals into analogue signals, an up-conversion mixer for shifting the analogue signals to a radio-frequency band and/or a power amplifier for outputting the amplified signal to the transmission antennas 4a, 4b.

The receiver 2 includes a receive antenna 5 and a decoder 6 configured to decode data, for example data which has been encoded by the encoder 3. Similar to the transmitter 1, the receiver 2 may include further components as well. For example, the receiver 2 may include a digital signal processor, a down-conversion mixer for down-converting received signals to an intermediate band or a baseband, a sampling unit for sampling a signal, an analogue/digital converter for converting the analogue received signal into a digital signal, a channel estimation unit for estimating channel coefficients on the basis of data received over a Common Pilot Channel (CPICH) and/or one or more filters for filtering the received signals.

The encoder 3 receives a signal s including data that is to be transmitted (transmit data) over the two transmit antennas 4a, 4b. The transmit data may be processed according to a particular permutation. Here, two consecutive complex data symbols s(m) and s(m+1) of the data streams may be pairwise mapped as follows:

$$s_1(m) = s(m), \quad (1)$$

$$s_1(m+1) = s(m+1), \quad (2)$$

$$s_2(m) = -s^*(m+1) \text{ and} \quad (3)$$

$$s_2(m+1) = s^*(m). \quad (4)$$

The symbol m corresponds to a time index labelling the m-th symbol while $s_1$ and $s_2$ denote data symbols that are to be transmitted over the first transmit antenna 4a and the second transmit antenna 4b, respectively. The star symbol "*" denotes complex conjugation.

Processing the transmit data according to equations (1) to (4) corresponds to an Alamouti coding, wherein two versions of the transmit data are provided such that the transmit data may be sent via two transmit antennas instead of only one. This way, the reliability of the data transfer is improved and the diversity at a receiver receiving the broadcast signals may be doubled (assuming a Rayleigh fading channel). Note that, according to the above mapping of equations (1) to (4), the transmit symbols are coded in time. In addition, since the symbols are transmitted over two transmit antennas, they are also coded in space. The encoding scheme may thus be referred to as a space time transmit diversity scheme.

The encoded transmit data is transmitted by the two transmit antennas 4a, 4b. The first data stream sent by the first transmit antenna 4a is transmitted over a first transmission channel (see first channel coefficient $h_1$) while the second data stream sent by the second transmit antenna 4b is transmitted over a second transmission channel (see second channel coefficient $h_2$). Successive data symbols y(m) and y(m+1) received at the receive antenna 5 may be written as $$y(m) = h_1 s(m) - h_2 s^*(m+1) + w(m) \quad (5)$$

and $$y(m+1) = h_1 s(m+1) + h_2 s^*(m) + w(m+1), \quad (6)$$

wherein the variable "w" denotes additive white Gaussian noise.

The signal y is decoded by the decoder 6 in compliance with the STTD scheme that has been used by the encoder 3. The decoded signals output by the decoder 6 may be written as $$\begin{pmatrix} \hat{s}(m) \\ \hat{s}(m+1) \end{pmatrix} = \frac{1}{|h_1|^2 + |h_2|^2} \begin{pmatrix} h_1 & h_2^* \\ -h_2 & h_1^* \end{pmatrix} \begin{pmatrix} y^*(m) \\ y(m+1) \end{pmatrix}. \quad (7)$$

Note that, according to equation (7), the channel coefficients $h_1$ and $h_2$ are required for decoding the signal y. For example, the channel coefficients $h_1$ and $h_2$ may be obtained by a channel estimation unit included in the receiver 2.

Figure 2:
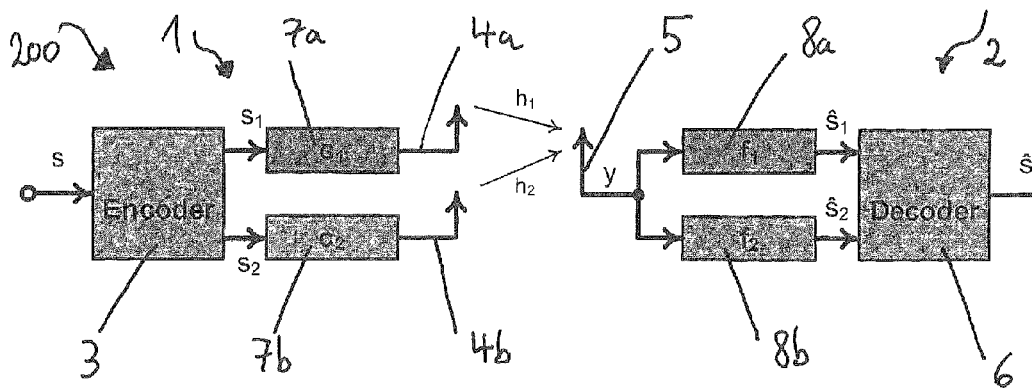
FIG. 2 schematically illustrates a further radio frequency communications system 200.

FIG. 2 schematically illustrates a further radio frequency communications system 200 including a transmitter 1 and a receiver 2. The transmitter 1 includes an encoder 3 which may be similar to the encoder 3 of FIG. 1, two spreading units 7a, 7b to spread signals using a spreading code and two transmit antennas 4a, 4b. The transmitter 1 may further include a scrambling unit (not shown) to scramble signals using a scrambling code. The receiver 2 includes a receive antenna 5, two equalizers 8a, 8b and a decoder 6 which may be similar to the decoder 6 of FIG. 1. For example, the receiver 2 may be operated as a linear receiver. In this case, the equalizers 8a, 8b may particularly be embodied as a Linear Minimum Mean Squared Error (LMMSE) equalizer, a Zero Forcing (ZF) equalizer or may, alternatively, be replaced by a RAKE receiver. In yet another embodiment, the receiver 2 may be operated as a non-linear receiver and may particularly include an interference canceller. The transmitter 1 and the receiver 2 of FIG. 2 may include further components as already mentioned in connection with FIG. 1.

The encoder 3 outputs encoded signals $s_1$ and $s_2$ to the spreading units 7a, 7b, wherein the first output signal $s_1$ is spread by a first spreading code $c_1$ and the second output signal $s_2$ is spread by a second spreading code $c_2$. The spread signals are broadcast over the air interface via transmit antennas 4a, 4b (see channel coefficients $h_1$ and $h_2$) and received at the receive antenna 5. The received signal y is equalized (or filtered) by each of the equalizers 8a, 8b in compliance with the spreading codes $c_1$ and $c_2$ that have been used by the spreading units 7a, 7b of the transmitter 1. Note that the data stream y is not split into two different data streams, but each of the equalizers 8a and 8b receives identical data.

The signals $\hat{s}_1$ and $\hat{s}_2$ output by the equalizers 8a, 8b may be written as $$\hat{s}_1(m) = y(m) * f_1(m) * h_1 \qquad (8)$$

and $$\hat{s}_2(m) = y(m) * f_2(m) * h_2 \qquad (9)$$

wherein the asterisk or star symbol "*" denotes the mathematical composition of a convolution. The equalized signals $\hat{s}_1$ and $\hat{s}_2$ are forwarded to the decoder 6 to generate non space time transmit diversity data $\hat{s}$.

During a transmission over the air interface the signal transmitted by the first transmit antenna 4a may interfere with the signal transmitted by the second transmit antenna 4b and vice versa. In other words, the signals transmitted over the transmit antennas 4a, 4b may consider each other as interference sources. This interference may decrease the quality of the equalization performed by the equalizers 8a, 8b which may result in a degradation in performance of the receiver 2.

Figure 3:
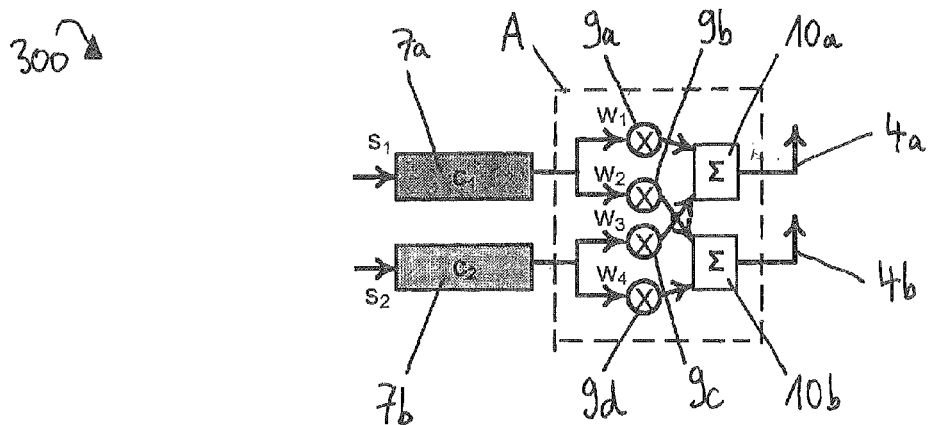
FIG. 3 schematically illustrates a transmitter 300.

FIG. 3 schematically illustrates a transmitter 300 including spreading units 7a, 7b, multipliers 9a, 9b, 9c, 9d, combining units 10a, 10b and transmit antennas 4a, 4b. For the sake of explanation, the multipliers 9a to 9d and the combining units 10a, 10b are summarized by a section A indicated by a dashed square. The transmitter 300 may include further components as already described in connection with previous figures. The spreading units 7a, 7b may be similar to the spreading units 7a, 7b of FIG. 2.

The first spreading unit 7a spreads a first signal $s_1$ using a first spreading code $c_1$ and forwards the spread signal to the multipliers 9a, 9b. Similarly, the second spreading unit 7b spreads a second signal $s_2$ using a second spreading code $c_2$ and outputs the spread signal to the multipliers 9c, 9d. The signal output by the first spreading unit 7a is multiplied by a first weight $w_1$ and a second weight $w_2$ using multipliers 9a and 9b, respectively. The weights $w_1$ and $w_2$ may be referred to as precoding weights. The signal output by the second spreading unit 7b is processed in a similar way, i.e. weighted by weights $w_3$ and $w_4$, respectively. In a next step, the signals weighted by the weights $w_1$ and $w_3$ are combined by the combining unit 10a and the signals weighted by the weights $w_2$ and $w_4$ are combined by the combining unit 10b. Note that the steps performed by the multipliers 9a to 9d and/or the combining units 10a, 10b may be referred to as "precoding". Each of the combining units 10a, 10b forwards a preceded signal to the transmit antennas 4a, 4b such that the signals may be transmitted over the air interface.

For example, the weights $w_1$ and $w_3$ may be chosen as constant real valued scalars while the weights $w_2$ and $w_4$ may be chosen as variable complex valued scalars. The weights may thus be defined as $$w_1 = w_3 = \frac{1}{\sqrt{2}} \qquad (10)$$

and $$w_4 = -w_2, \qquad (11)$$

wherein $$w_2 \in \left\{ \frac{1+i}{2}, \frac{1-i}{2}, \frac{-1+i}{2}, \frac{-1-i}{2} \right\}. \qquad (12)$$

Here, the variable i denotes complex unity. The weights $w_1$ to $w_4$ may be combined to a first vector ($w_1$, $w_2$) and a second vector ($w_3$, $w_4$) which are orthogonal to each other, thus linearly independent and may be referred to as precoding vectors.

During an operation of the transmitter 300, the signals $s_1$ and $s_2$ may correspond to independent data streams that may be separately encoded. Hence, the processing of transmit data according to FIG. 3 results in an effective doubling of the data rate. Since there are two transmit antennas 4a, 4b, the space dimension is reused, i.e. multiplexed. A transmission of signals using the transmitter 300 may thus be referred to as spatial-multiplexing.

Figure 4:
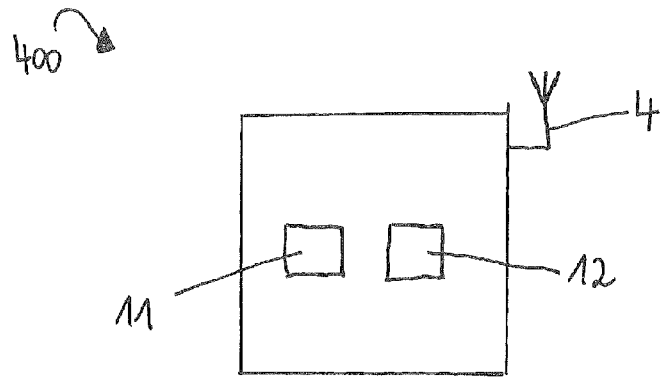
FIG. 4 schematically illustrates a transmitter 400 as an exemplary embodiment.

FIG. 4 schematically illustrates a transmitter 400 as an exemplary embodiment. The transmitter 400 includes a first unit 11 to encode data according to a space time transmit diversity scheme and a second unit 12 to spatial-multiplex data. The transmitter 400 is configured to operate in an operating mode in which data is processed by the first unit and the second unit. The transmitter 400 may include further components as already described in connection with previous figures. A method for operating the transmitter 400 will be explained in connection with FIGS. 7 and 9. Note further that the radio communications system 600 of FIG. 6 includes a similar transmitter 1.

The first unit 11 and the second unit 12 may correspond to the encoder 3 of FIGS. 1, 2 and the section A of FIG. 3, respectively. The transmitter 400 is thus configured to transmit signals which are encoded according to an STTD scheme and spatial-multiplexed at the same time. It is understood that the transmitter 400 may be further configured to selectively use the first and second unit 11, 12 and thus transmit signals that are exclusively encoded to an STTD scheme or exclusively spatial-multiplexed. A comparison with the previous figures shows that the transmitter 400 is thus capable to perform the same operations as the transmitters 1 of FIGS. 1 and 2 and the transmitter 300 of FIG. 3.

Figure 5:
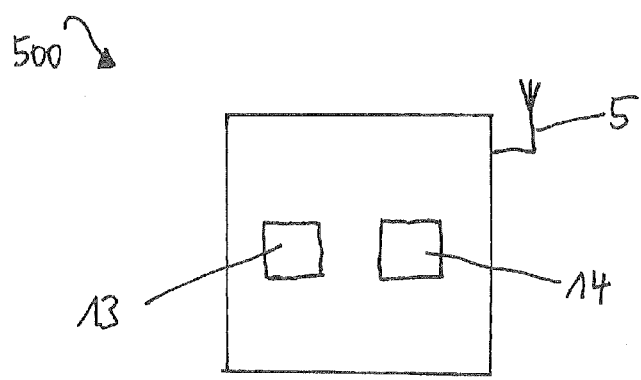
FIG. 5 schematically illustrates a receiver 500 as an exemplary embodiment.

FIG. 5 schematically illustrates a receiver 500 as an exemplary embodiment. The receiver 500 includes an antenna 5 to receive data which may be STTD encoded and spatial-multiplexed, for example data broadcast by the transmitter 400 of FIG. 4. The receiver 500 further includes a first unit 13 to spatial-demultiplex data and a second unit 14 to decode data to generate non space time transmit diversity encoded data. The receiver 500 is configured to operate in an operating mode in which data is processed by the first unit 13 and the second unit 14. The receiver 500 may include further components as already described in connection with previous figures. A method for operating the receiver 500 will be explained in connection with FIG. 8. Note further that the radio communications system 600 of FIG. 6 includes a similar receiver 2.

Figure 6:
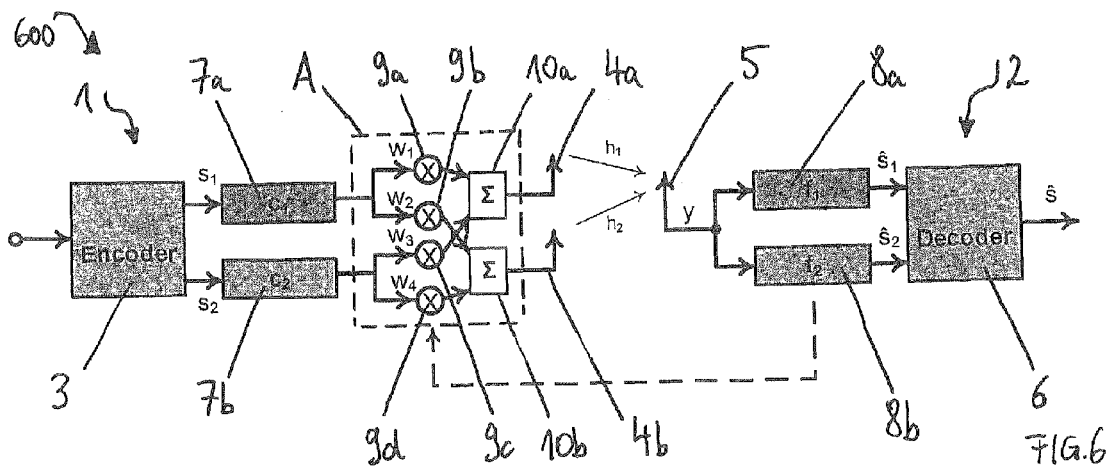
FIG. 6 schematically illustrates a further radio frequency communications system 600 including a transmitter as a further exemplary embodiment and a receiver as a further exemplary embodiment.

FIG. 6 schematically illustrates a radio frequency communications system 600 including a transmitter 1 and a receiver 2. The transmitter 1 includes an encoder 3 which may be similar to the encoders 3 of FIGS. 1 and 2 and spreading units 7a, 7b which may be similar to the spreading units 7a, 7b of FIGS. 2 and 3. In addition, the transmitter 1 includes multipliers 9a, 9b, 9c, 9d and combining units 10, 10b which may be similar to the corresponding units described in connection with FIG. 3 as well as transmit antennas 4a, 4b. The receiver 2 includes a receive antenna 5, equalizers 8a, 8b which may be similar to the equalizers 8a, 8b of FIG. 2 and a decoder 6 which may be similar to the decoders 6 of FIGS. 1 and 2. The transmitter 1 and the receiver 2 may include further components as they have already been described in connection with previous figures.

During an operation of the radio communications system 600, the encoder 3 encodes transmit data according to an STTD scheme which may, for example, be based on an Alamouti code. The encoder 3 forwards a first encoded data stream $s_1$ to the first spreading unit 7a which spreads the data using a first spreading code Similarly, a second encoded data stream $s_2$ is spread by the second spreading unit 7b using a second spreading code $c_2$. In another embodiment, the encoded data streams $s_1$ and $s_2$ may additionally be scrambled by scrambling units (not shown) using a first and a second scrambling code. The spread data streams output by the spreading units 7a and 7b are forwarded to the components of section A and processed as it has already been described in connection with FIG. 3.

The STTD encoded and spatial-multiplexed data is broadcast by the antennas 4a, 4b and transmitted over the air interface via two transmission channels (see channel coefficients $h_1$ and $h_2$). The transmitted signals are received by the receive antenna 5 and forwarded to the equalizers 8a and 8b, respectively. Note that the received data stream y is not split into two different data streams, but each of the equalizers 8a and 8b receives identical data. The first equalizer 8a filters the received data in order to obtain data which has been transmitted by the first transmit antenna 4a. Undesired signals not spread by the spreading code $c_1$ (and thus not sent by the first antenna 4a) are not despread and thus do not pass the equalizer 8a. In a similar way, the signals sent by the second transmit antenna 4b are obtained by filtering the received data by the second equalizer 8b. Each of the equalizers 8a, 8b thus acts as a despreading unit. If the received signals have been scrambled by a scrambling unit of the transmitter 1, a descrambling unit (not shown) may additionally descramble the received data streams.

Besides despreading the received data signals, the equalizers 8a, 8b may further be configured to spatial-demultiplex the received data. For this purpose, the equalizers 8a, 8b need to know the weights $w_1$ to $w_4$ that have been used in the transmitter 1 to spatial-multiplex the transmit data (see section A). For this purpose, the transmitter 1 may communicate the used weights to the receiver 2 over a communication channel, for example a Shared Control Channel (SCCH).

The despread and spatial-demultiplexed signals $\hat{s}_1$ and $\hat{s}_2$ are forwarded to the decoder 6 to generate non space time transmit diversity encoded data, wherein the decoding is performed in compliance with the STTD scheme employed by the encoder 3. Note that the channel coefficients $h_1$ and $h_2$ are required for obtaining the signals $\hat{s}_1$ and $\hat{s}_2$ (see equations (8) and (9). The receiver 2 may thus further include a channel estimation unit (not shown) for estimating the channel coefficients $h_1$ and $h_2$, thereby using data transmitted over a pilot channel. The decoded signal $\hat{s}$ output by the decoder 6 may be processed by further components of the receiver 2 which are not explicitly illustrated for the sake of simplicity.

There are several possibilities for choosing an appropriate set of weights $w_1$ to $w_4$ used by the components of section A. The precoding vectors ($w_1$, $w_2$) and ($w_3$, $w_4$) may be chosen linearly independent such that the signal spaces of the signals transmitted by the transmit antennas 4a, 4b are linearly independent as well. In particular, the precoding vectors may be orthogonal to each other resulting in orthogonal signal spaces. Assuming an ideal signal transmission over the air interface, the two signal spaces are still orthogonal when the signals are received at the receiver 2.

For example, the weights $w_1$ to $w_4$ may be chosen as it has already been described in connection with FIG. 3. According to one embodiment, all weights may be constant over time. Alternatively, one or more of the weights may vary over time. For the case of varying weights, an additional communication between the transmitter 1 and the receiver 2 may be established. Here, the receiver 2 may send a Channel Quality Indication (CQI) to the transmitter 1 as well as two linearly independent vectors. The two vectors received by the transmitter 1 may be referred to as preferred precoding vectors or Precoding Control Indication (PCI).

In FIG. 6, the transmission of said information is indicated by a dashed arrow. Note that such a transmission may not be required for the case of precoding vectors constant over time. For the case of weights conforming with equations (10) and (11), only one vector ($w_1^{pref}$, $w_2^{pref}$) needs to be transmitted. The transmitter 1 may generate the precoding vectors ($w_1$, $w_2$) and ($w_3$, $w_4$) on the basis of the received data, i.e. the CQI and/or the vector ($w_1^{pref}$, $w_2^{pref}$). According to the above, the spatial-multiplexing of the radio frequency communications system 600 may thus be based on an open-loop approach or a closed-loop approach.

As it has already been described, in the communications system 200 of FIG. 2, the transmitted data streams may consider each other as interference leading to a degradation in performance. This is not the case for the communications system 600 of FIG. 6. Similar to FIG. 2, the two data streams broadcast by the transmit antennas 4a, 4b are transmitted on the same physical resource due to the STTD encoding. However, the corresponding signal spaces are linearly independent. Consequently, the transmitted data streams do not interfere with each other such that a degradation of performance during the equalization by the equalizers 8a, 8b may be avoided or at least attenuated. Hence, the radio communications system 600 of FIG. 6 provides the benefits of encoding data according to an STTD scheme, i.e. doubling the diversity at the receiver, but without suffering a degradation in performance during an equalization. Compared to FIG. 2, the receiver 2 of system 600 may therefore receive signals sent by the transmitter 1 at a greater distance at the same transmit power. It is further noted that the communications system 600 provides a doubling of diversity without doubling the number of receive antennas, i.e. without increasing the complexity of the receiver 2. In return, the complexity of the transmitter 1 is increased by the additional components of section A.

Referring back to FIG. 3, an operation of the transmitter 300 may result in a doubling of the data rate for the case of two independent data streams $s_1$ and $s_2$. This is not the case for the transmitter 1 of communications system 600. Here, the data streams transmitted over the antennas 4a, 4b are encoded or permuted by the encoder 3 according to an STTD scheme and thus depend on each other. From equations (1) to (4) it becomes apparent that (except for complex conjugation and change of sign) the two data streams include the same data. As a consequence, the data rate does not effectively double.

Figure 7:
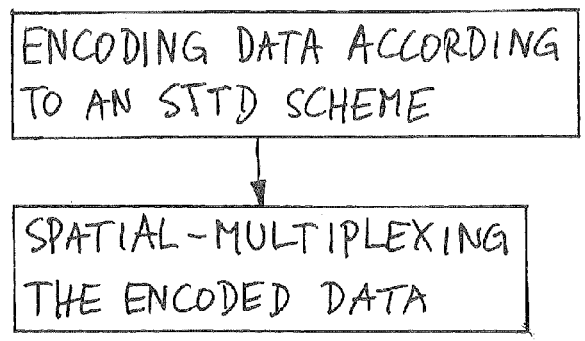
FIG. 7 schematically illustrates a method 700 as an exemplary embodiment.

FIG. 7 schematically illustrates a method 700 as an exemplary embodiment. The method 700 includes two steps S1, S2 and may, for example, be read in the context of the transmitters shown in FIGS. 4 and 6. In a first step S1, data is encoded according to a space time transmit diversity scheme. Referring back to FIGS. 4 and 6, step S1 may be performed by the first unit 11 and the encoder 3, respectively. In the second step S2, the encoded data is spatial-multiplexed. Referring back to FIGS. 4 and 6, step S2 may be performed by the second unit 12 and the components of section A, respectively.

Figure 8:
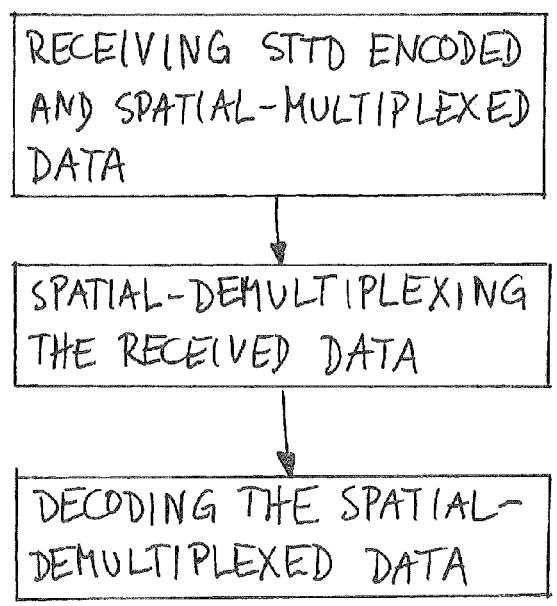
FIG. 8 schematically illustrates a method 800 as a further exemplary embodiment.

FIG. 8 schematically illustrates a method 800 as a further exemplary embodiment. The method 800 includes three steps S1 to S3 and may, for example, be read in connection with the receivers of FIGS. 5 and 6. In a first step S1, space time transmit diversity encoded and spatial-multiplexed data is received. In each of FIGS. 5 and 6, the data is received by the receive antenna 5. In the second step S2, the received data is spatial-demultiplexed. Referring back to FIGS. 5 and 6, the spatial-demultiplexing is done by the first unit 13 and the equalizers 8a, 8b, respectively. In a third step S3, the spatial-demultiplexed data is decoded to generate non space time transmit diversity encoded data. Referring back to FIGS. 5 and 6, the decoding is performed by the second unit 14 and the decoder 6, respectively.

Figure 9:
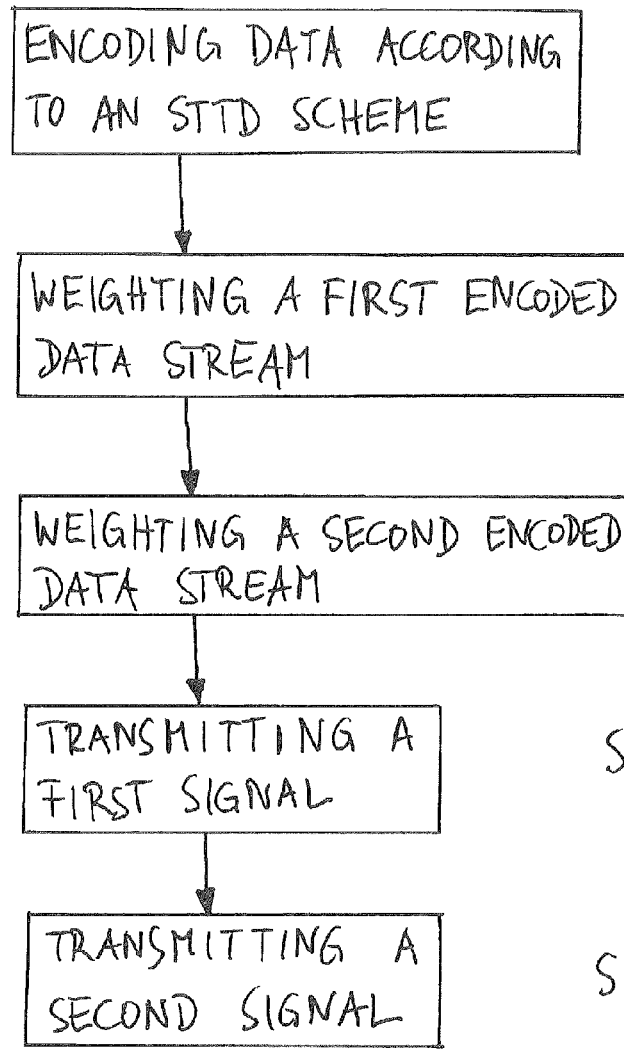
FIG. 9 schematically illustrates a method 900 as a further exemplary embodiment.

FIG. 9 schematically illustrates a method 900 as a further exemplary embodiment. The method 900 includes five steps S1 to S5 and may, for example, be read in connection with the transmitter of FIG. 6. In a first step S1, data is encoded according to a space time transmit diversity scheme to generate a first encoded data stream and a second encoded data stream (see FIG. 6, encoder 3 and data streams $s_1$, $s_2$). In the second step S2, the first encoded data stream is weighted using a first weighting vector comprising a first weight and a second weight to generate a first weighted data stream and a second weighted data stream (see FIG. 6, first weighting vector ($w_1$, $w_2$) and multipliers 9a, 9b). In the third method step S3, the second encoded data stream is weighted using a second weighting vector comprising a third weight and a fourth weight to generate a third weighted data stream and a fourth weighted data stream (see FIG. 6, second weighting vector ($w_3$, $w_4$) and multipliers 9c, 9d). The first weighting vector ($w_1$, $w_2$) and the second weighting vector ($w_3$, $w_4$) are linearly independent. In the fourth step S4, a first signal is transmitted over a first antenna, wherein the first signal is based on the first weighted data stream and the third weighted data stream (see FIG. 6, combining unit 10a and antenna 4a). In the fifth step S5, a second signal is transmitted over a second antenna, wherein the second signal is based on the second weighted data stream and the fourth weighted data stream (see FIG. 6, combining unit 10b and antenna 4b).

Figure 10:
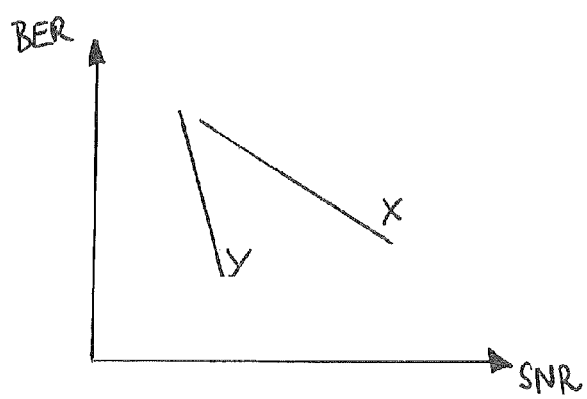
FIG. 10 schematically illustrates the performance of two receivers.

FIG. 10 schematically illustrates the performance of two receivers, wherein the Bit Error Rate (BER) is plotted against the Signal to Noise Ratio (SNR). Note that FIG. 10 is of pure qualitative nature such that, for example, the axes includes no scaling. A first graph X indicates values for a first receiver receiving data in a radio frequency communications system similar to FIG. 2. A second graph Y indicates values for a second receiver receiving data in a radio frequency communications system similar to FIG. 6. From FIG. 10 it thus becomes apparent that the communications system 600 requires lower SNR values to provide a similar decrease of the BER in comparison to the communications system 200.

It is understood that the devices and methods described in the context of two transmit antennas and one receive antenna may be generalized to devices and methods including a higher number of transmit and/or receive antennas. For example, extending the transmitter 1 of FIG. 6 to a transmitter including three instead of two transmit antennas would require three instead of two linearly independent precoding vectors in order to generate three data streams having linearly independent signals spaces.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application.

What is claimed is:

1. A method, comprising:
encoding data of a data stream according to a space time transmit diversity scheme, the encoding comprising:
encoding consecutive data symbols of the data stream in time, wherein the consecutive data symbols are mapped multiple times to different instants of time; and
encoding the consecutive data symbols of the data stream in space, wherein the consecutive data symbols are mapped from the data stream to multiple data streams; and
spatial-multiplexing the encoded data, the spatial-multiplexing comprising:
after encoding the consecutive data symbols in time and in space, precoding the encoded data symbols based on multiple linearly independent precoding vectors.

2. The method of claim 1, wherein the space time transmit diversity scheme is based on an Alamouti code.

3. The method of claim 1, wherein spatial-multiplexing the encoded data comprises precoding the encoded data using two linearly independent precoding vectors.

4. The method of claim 3, wherein the two linearly independent precoding vectors are orthogonal to each other.

5. The method of claim 3, wherein each one of the linearly independent precoding vectors comprises a first weight and a second weight.

6. The method of claim 5, wherein the first weight and the second weight are constant over time.

7. The method of claim 5, wherein the first weight is constant over time and the second weight is variable over time.

8. The method of claim 3, wherein the encoded data comprises a first data stream which is processed using a first one of the linearly independent precoding vectors and a second data stream which is processed using a second one of the linearly independent precoding vectors.

9. The method of claim 3, further comprising:
receiving data comprising a channel quality indication and two linearly independent vectors; and
generating the precoding vectors on the basis of the information comprised in the received data.

10. The method of claim 1, wherein the encoded data comprises a first data stream and a second data stream.

11. The method of claim 1, further comprising at least one of:
spreading the encoded data using a spreading code and scrambling the encoded data using a scrambling code.

12. The method of claim 1, further comprising:
transmitting the encoded and spatial-multiplexed data over a first antenna and a second antenna.

13. A transmitter, comprising:
a first unit to encode data of a data stream according to a space time transmit diversity scheme, the encoding comprising:
encoding consecutive data symbols of the data stream in time, wherein the consecutive data symbols are mapped multiple times to different instants of time; and
encoding the consecutive data symbols of the data stream in space, wherein the consecutive data symbols are mapped from the data stream to multiple data streams; and
a second unit to spatial-multiplex encoded data, wherein the transmitter is configured to operate in an operating mode in which data is processed by the first unit and the second unit, the spatial-multiplexing comprising:
after encoding the consecutive data symbols in time and in space, precoding the encoded data symbols based on multiple linearly independent precoding vectors.

14. The transmitter of claim 13, wherein the space time transmit diversity scheme is based on an Alamouti code.

15. The transmitter of claim 13, wherein the spatial-multiplexing of data comprises precoding the data using two linearly independent precoding vectors.

16. The transmitter of claim 13, further comprising at least one of:
a spreading unit to generate spread data and a scrambling unit to generate scrambled data, either or both in conjunction with the spatial-multiplexing of the encoded data.

* * * * *